US006640610B2

(12) United States Patent
Lueth, II et al.

(10) Patent No.: US 6,640,610 B2
(45) Date of Patent: Nov. 4, 2003

(54) AUTOMATIC INTEGRATED MECHANICAL AND ELECTRICAL ANGULAR MOTION DETECTOR TEST SYSTEM

(75) Inventors: Richard A. Lueth, II, Walpole, MA (US); Brian G. Beucler, Sandown, NH (US); Robert E. Malone, Westford, MA (US); Robert P. O'Reilly, Natick, MA (US); Christopher F. Hanle, Chelmsford, MA (US)

(73) Assignee: Analog Devices, Inc., Norwood, MA (US)

( * ) Notice: Subject to any disclaimer, the term of this patent is extended or adjusted under 35 U.S.C. 154(b) by 132 days.

(21) Appl. No.: 09/822,117

(22) Filed: Mar. 30, 2001

(65) Prior Publication Data

US 2002/0139169 A1 Oct. 3, 2002

(51) Int. Cl.[7] .............................................. G01P 21/00
(52) U.S. Cl. ................................ 73/1.38; 73/1.77
(58) Field of Search ................................ 73/1.38, 1.37, 73/1.77, 1.82, 663

(56) References Cited

U.S. PATENT DOCUMENTS

| 2,882,717 | A | * | 4/1959 | Brown ........................ 73/1.38 |
| 3,135,120 | A | * | 6/1964 | Richardson ..................... 74/5.4 |
| 5,353,642 | A | * | 10/1994 | Hasegawa et al. ........ 73/1.38 X |
| 5,408,189 | A | * | 4/1995 | Swart et al. .................. 324/758 |
| 5,895,858 | A | | 4/1999 | Malone et al. ................ 73/1.38 |
| 6,122,961 | A | * | 9/2000 | Geen et al. ............... 73/504.12 |
| 6,209,383 | B1 | * | 4/2001 | Mueller et al. ............... 73/1.77 |

FOREIGN PATENT DOCUMENTS

| EP | 911635 | * | 4/1999 | ........... G01P/21/00 |
| JP | 2-32265 | * | 2/1990 | ........... G01P/21/00 |
| JP | 4-6473 | * | 1/1992 | ............... 73/514.31 |
| JP | 7-110342 | * | 4/1995 | ........... G01P/21/00 |
| JP | 10-2914 | * | 1/1998 | ........... G01P/21/00 |
| JP | 10-227810 | * | 8/1998 | ........... G01P/21/00 |

OTHER PUBLICATIONS

Derwent–Acc–No: 1984–099291 "Accelerometer test rig—has lever system on vertical drive shaft with radial adjustments by motor & lead screw" abstract SU 1027629 A Jul. 1983 Kuznetsov et al.*
Derwent–Acc–No.: 1994–063932 "Variable acceleration test–stand for instrumentation equipment—" abstract of SU 1789936 A1 Seaenyuk.*
"High Performance Optical Scanner" Product Brochure, 2 pages, Cambridge Technology Inc. by Feb. 1999.
B. Rohr "Speed vs. Accuracy in Galvo–Based Scanners", 4 pages, Gordon Publications by Feb. 1999.

* cited by examiner

*Primary Examiner*—Thomas P. Noland
(74) *Attorney, Agent, or Firm*—Iandiorio & Teska (57) ABSTRACT

An automatic integrated mechanical and electrical angular motion detector test system includes a test fixture for holding an angular motion detector to be mechanically and electrically tested; a handler subsystem for feeding an angular motion detector to the test fixture; a motor having a rotatable shaft attached to the test fixture for rotating it and the angular motion detector it holds; and an electrical tester for testing the angular motion detector while it is rotating.

15 Claims, 9 Drawing Sheets

AUTOMATIC INTEGRATED MECHANICAL AND ELECTRICAL ANGULAR MOTION DETECTOR TEST SYSTEM

FIELD OF INVENTION

This invention relates to an automatic integrated mechanical and electrical angular motion detector test system.

BACKGROUND OF INVENTION

Conventional integrated circuit (IC) device handlers automatically feed IC devices to a contactor which makes electrical interconnection between the IC device and a tester. After the tester runs a series of tests on that IC device, the device is removed from the contactor and output from the handler to one of a number of bins depending on whether it passed the test or failed it. There may be a number of future bins for classifying different types of failures. These systems have high throughput typically from 500–8000 devices/hour with little or no human intervention.

Separately, gyroscope testers for conventional strategic and tactical gyroscopes typically employ a large rate table with fixtures including temperature chambers for testing a gyroscope. The gyroscopes are manually placed and installed before testing and are manually removed after testing. The testing involves performing electrical testing while the gyroscope is being rotated in order to insure proper performance under actual operating conditions. A typical test time is several minutes to a few hours per gyroscope. These gyroscopes are relatively heavy and large, e.g. strategic gyroscopes—two inch diameter, four inches long; tactical gyroscopes—one inch diameter, two inches long. Typically a number of these gyroscopes are tested at one time to produce even a reasonable throughput. The tables are large and powerful to obtain the necessary rotational speed and accuracy with the gyroscopes loaded on board. Further, these tables must be precisely controlled in order to insure the reliability of the test data of these precision gyroscopes. The table must rotate at significant speed for a substantial period of time with very little fluctuation in the rotational speed.

More recently, micromachining techniques have produced extremely small, lightweight micromachined gyroscopes. See U.S. Pat. No. 6,122,961. These gyroscopes, too, must be tested. However, the more commercial nature of their market requires precision testing but with much higher throughput and less human intervention. The rate tables so appropriate for the larger gyroscopes are excessive and too slow for processing these micromachined gyroscopes.

SUMMARY OF THE INVENTION

It is therefore an object of this invention to provide an improved automatic, integrated mechanical and electrical angular motion detector test system.

It is a further object of this invention to provide such an angular motion detector test system which is smaller, lighter, and simpler.

It is a further object of this invention to provide such an angular motion detector test system which has a higher throughput.

It is a further object of this invention to provide such an angular motion detector test system which is faster, more efficient, more accurate and more reliable.

It is a further object of this invention to provide such an angular motion detector test system which measures the electrical parameters of a gyroscope while it is being rotated to obtain performance data under various operating conditions.

It is a further object of this invention to provide such an angular motion detector test system which enables the mechanical and electrical testing of an IC gyroscope.

It is a further object of this invention to provide such an angular motion detector test system which provides a sinusoidal drive to rotate the gyroscope under test.

The invention results from the realization that a smaller, simpler, lightweight, automated, angular motion detector test system with high throughput can be achieved using a test fixture for holding a device to be tested, a handler for feeding devices to be tested to the test fixture, rotating the test fixture with a device to be tested and electrically testing the device while it is being rotated, and the further realization that micromachined angular motion detectors can be handled and fed to the test fixture as common IC's and then rotated in a stepwise fashion or by oscillation as with a galvanometer to obtain performance data from the electrical circuits of the device while it is being rotated.

This invention features an automatic integrated mechanical and electrical angular motion detector test system. There is a test fixture for holding an angular motion detector to be mechanically and electrically tested and a handler subsystem for feeding an angular motion detector to the test fixture. A motor has a rotatable shaft attached to the test fixture for rotating it and the angular motion detector that it holds and an electrical tester tests the angular motion detector while it is rotating.

In a preferred embodiment the test fixture may include a seat for supporting the angular motion detector in the test fixture. There may be clamp for urging an angular motion detector against the seat. There may be a vacuum chuck for holding and sensing the presence of an angular motion detector to be tested. There may be a contactor having at least one set of gripping contacts for engaging an angular motion to be tested. The clamp may include a lever and an actuator for driving the lever to operate the clamp. The contactor may include a lever and an actuator for driving the lever to operate the gripping contacts. The motor may include an oscillator motor. The motor may provide a sinusoidal output motion to the test fixture. The motor may include a stepper motor or galvanometer. The angular motion detector may be an angular accelerometer or a gyroscope. The gyroscope may be an integrated circuit chip and it may be micromachined.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
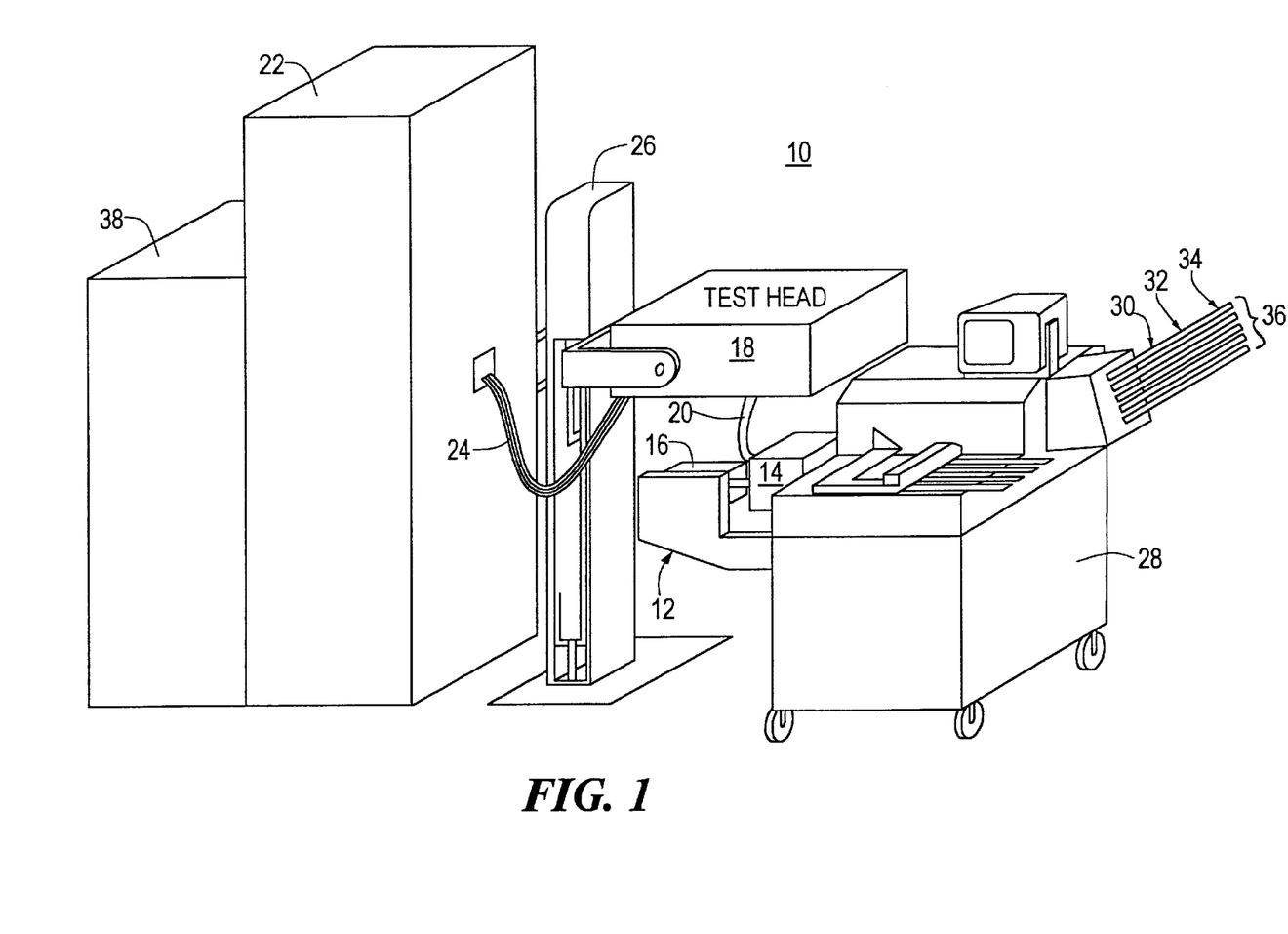
FIG. 1 is a schematic three dimensional block diagram of an angular motion detector test system according to this invention.

There is shown in FIG. 1 an angular motion detector test system 10 according to this invention including a test fixture contained within a thermal housing 14 and having a motor 16. Test head 18 is interconnected with the device under test (DUT) by cable 20 and test head 18 is in turn connected to electrical tester 22 by cable 24. A manipulator 26 such as made by Intest Corporation may be used to position test head 18 to accommodate the various handlers 28 that may be used with the system. In this particular case, the handler is an ASECO model S130 handler. Handler 28 receives micromachined integrated circuit angular motion detector chips 30, 32, and 34 in tubes 36. Computer 38 can be used to control the entire system and to interface with a local area network or larger network.

A similar handler system and test device for translational motion with respect to accelerometers is disclosed in U.S. Pat. No. 5,895,858 Integrated Accelerometer Test System, Malone et al. Issued Apr. 20, 1999 to the same assignee and is incorporated herein by reference in its entirety.

In operation, each integrated circuit chip 30, 32, 34 . . . is delivered by handler 28 to test fixture 42 (FIG. 5) where it is rotated in thermal housing 14 by means of galvanometer motor 16 while simultaneously being electrically tested by test head 18 through cable 20. Galvanometer motor 16 may be a model 6900 scanner motor made by Cambridge Technology Inc. Handler 28 takes an individual integrated circuit chip 44 and places it on test fixture 12 (FIG. 3) and more specifically on to the contactor 42.

Angular motion detector test system 10 of the subject invention may be used to test angular motion detectors such as angular accelerometers and gyroscopes. For simplicity, the following description refers to gyroscopes. Angular accelerometers would be tested in the same manner as described with respect to gyroscopes.

Figure 2:
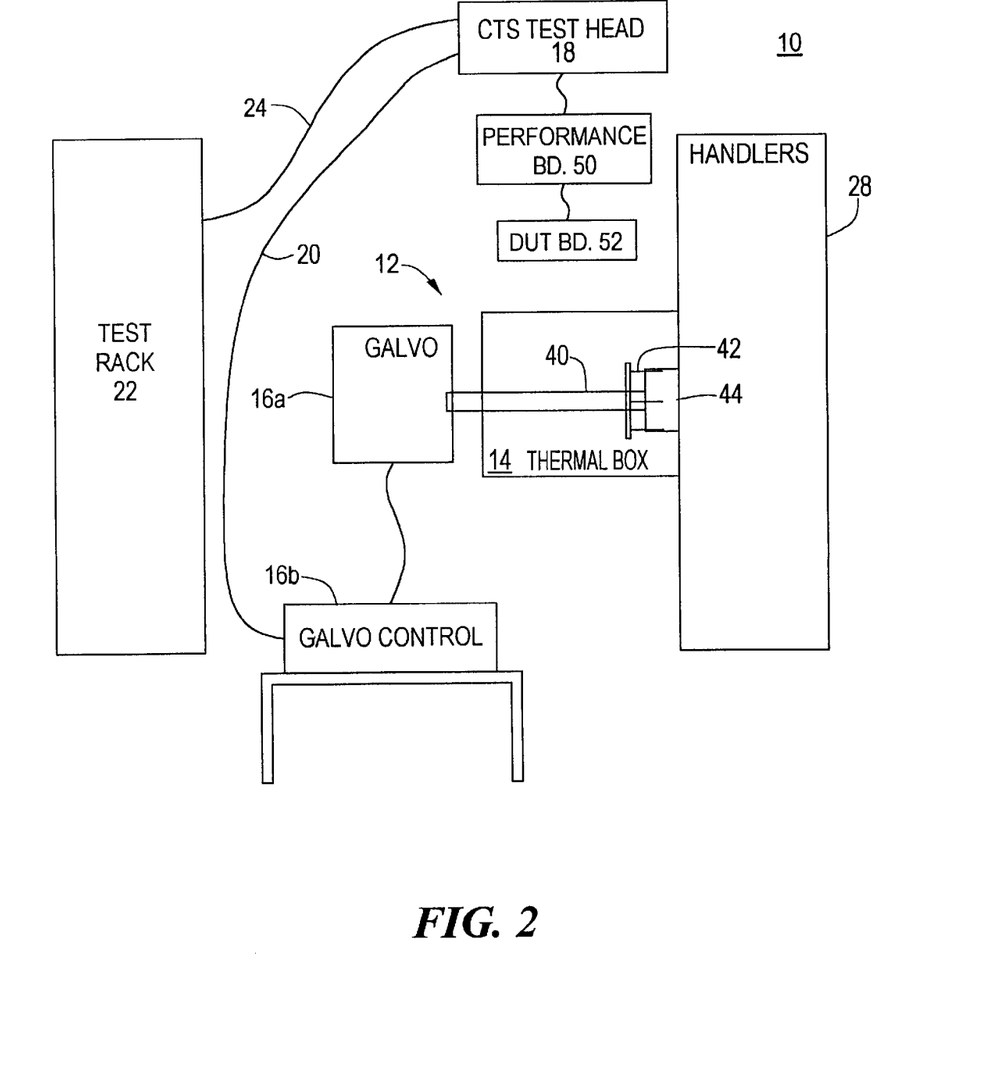
FIG. 2 is a block diagram of portions of the system of FIG. 1.

Galvanometer motor 16 may actually include galvanometer 16a, FIG. 2, and galvanometer control circuit 16b. Galvanometer 16a has a shaft 40 which rotates contactor 42 that carries the device under test (DUT) 44. Manipulator 26 and computer 38 have been omitted from FIG. 2. The performance board 50 and device under test board 52 which are assembled to test head 18 have been broken out separately in FIG. 2.

Figure 3:
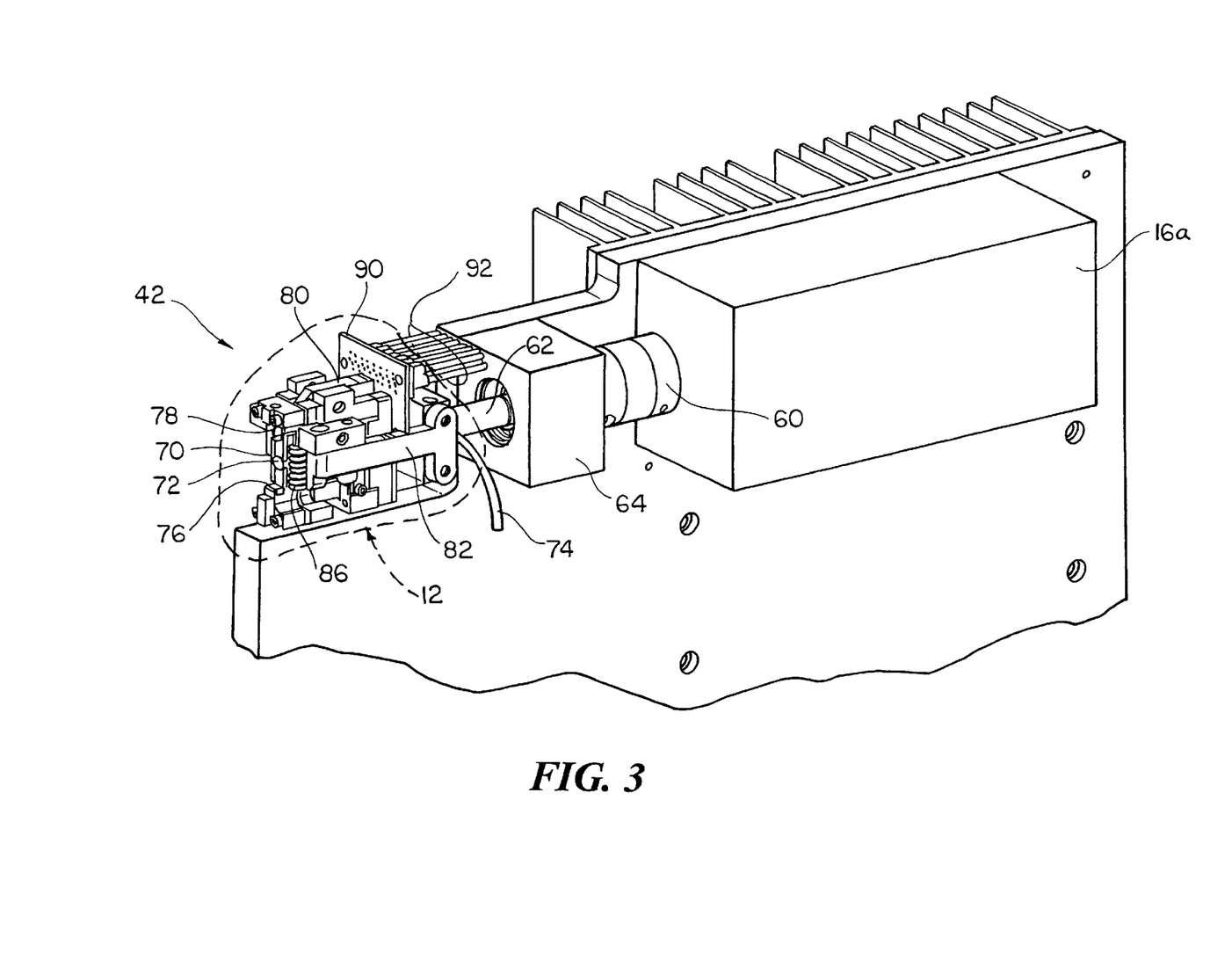
FIG. 3 is a diagrammatic three dimensional partially broken away view from the upper right of the test fixture of FIGS. 1 and 2 according to this invention.
Figure 4:
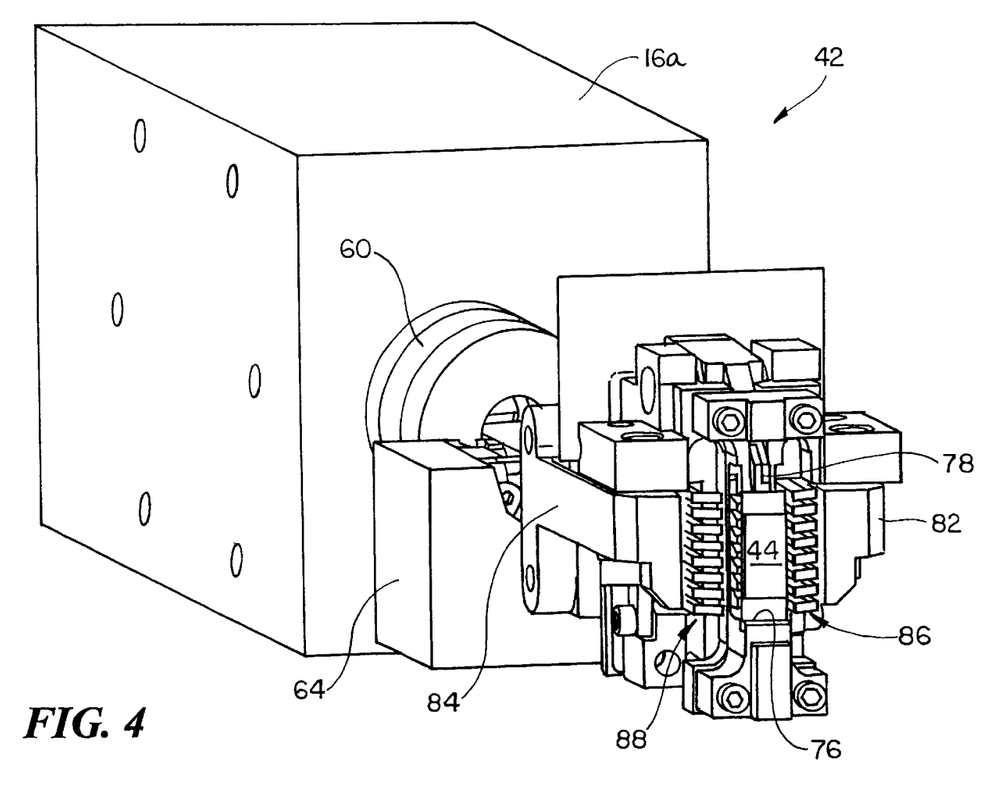
FIG. 4 is a view similar to FIG. 3 but viewed from the lower left.
Figure 5:
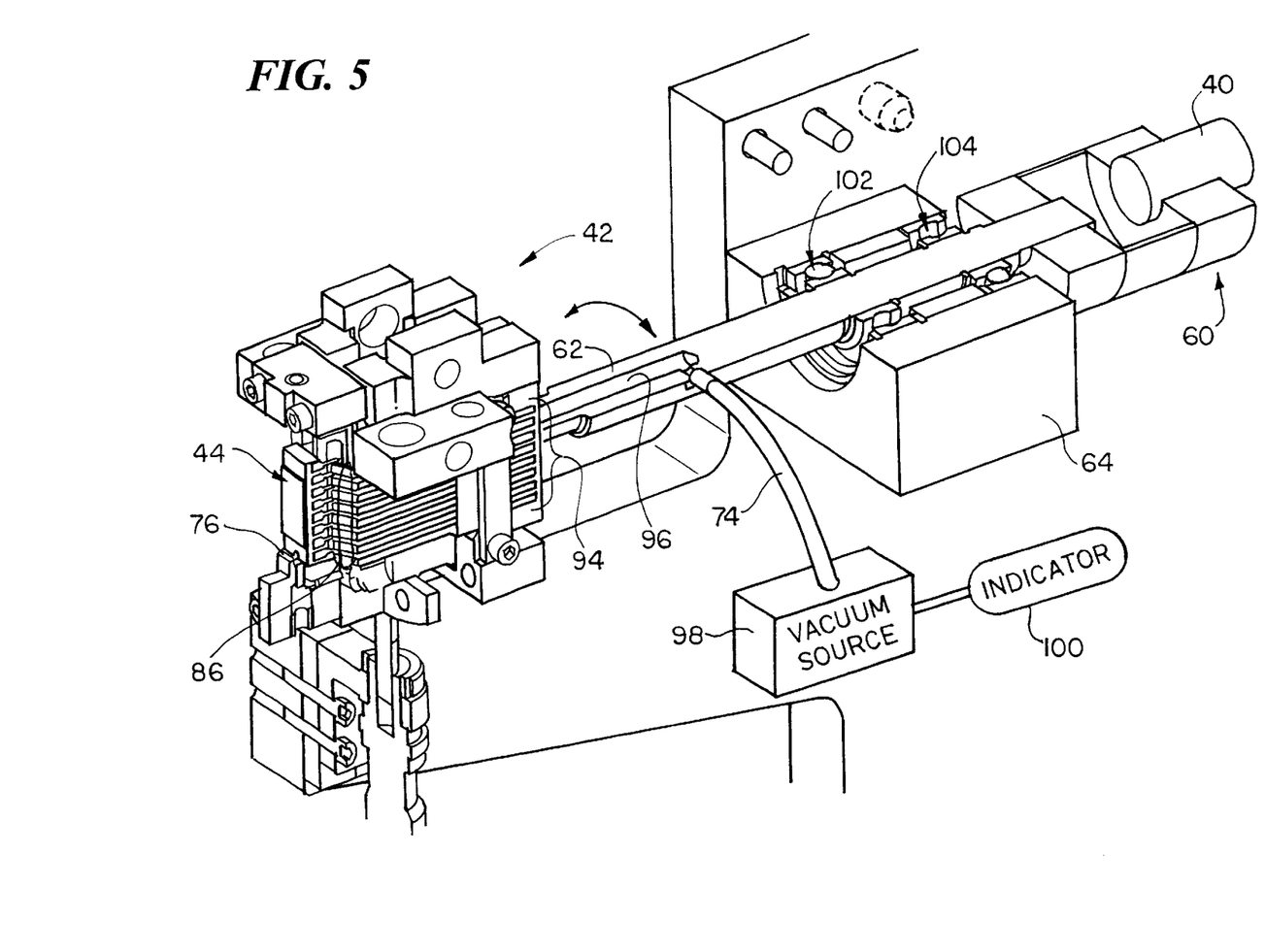
FIG. 5 is an enlarged more detailed three dimensional view from the upper right of the test fixture of FIG. 3.

Galvanometer shaft 40, FIGS. 2 and 5, are connected by a coupler 60 by means of shaft 62 and pillow block 64 to contactor 42. Contactor 42 includes a mounting section 70 and a vacuum chuck 72. Vacuum applied through hose 74 to chuck 72 is used to give an indication that an integrated circuit gyroscope chip is truly in place and ready for testing. Mounting section 70 includes the seat 76 which receives the bottom edge of the integrated circuit gyroscope chip and a clamp 78 which is operated by clamp lever 80 to hold the upper edge of the integrated circuit gyroscope against seat 76. Side levers 82, FIGS. 3 and 84, FIG. 4 are spring loaded to press their respective contact elements 86, FIG. 3, and 88, FIG. 4, inwardly to grip the contacts of the micromachined integrated circuit gyroscope chip 44, FIG. 4, when it is in place on mounting section 70. Electrical testing is accomplished through interface board 90 which interconnects with the contact elements 86 and 88 and terminates in wires 92 which eventually form into cable 20 as shown in FIGS. 1 and 2.

The ends 94 of contacts 86 that connect to interface board 90 are shown in more detail in FIG. 5 where the side levers 82 and 84 as well as the clamp lever have been eliminated for clarity. Contacts 88 have similar ends (not shown) on the other side which also interconnect with interface board 90. Also shown in FIG. 5 is a cutaway of drive shaft 62 showing its central bore 96 through which the vacuum is applied to vacuum chuck 72, FIG. 3. The vacuum is supplied through vacuum line 74, FIG. 5 from a vacuum source 98 and an indicator 100 may be used to show when a vacuum is being pulled indicating when an integrated circuit gyroscope chip 44 is truly in place on contactor 42. FIG. 5 also depicts a broken away view of pillow block 64 showing its internal bearing assemblies 102, 104. Coupling 60 is also depicted in a sectional view showing the connection of drive shaft 62 and galvanometer shaft 40.

Figure 6:
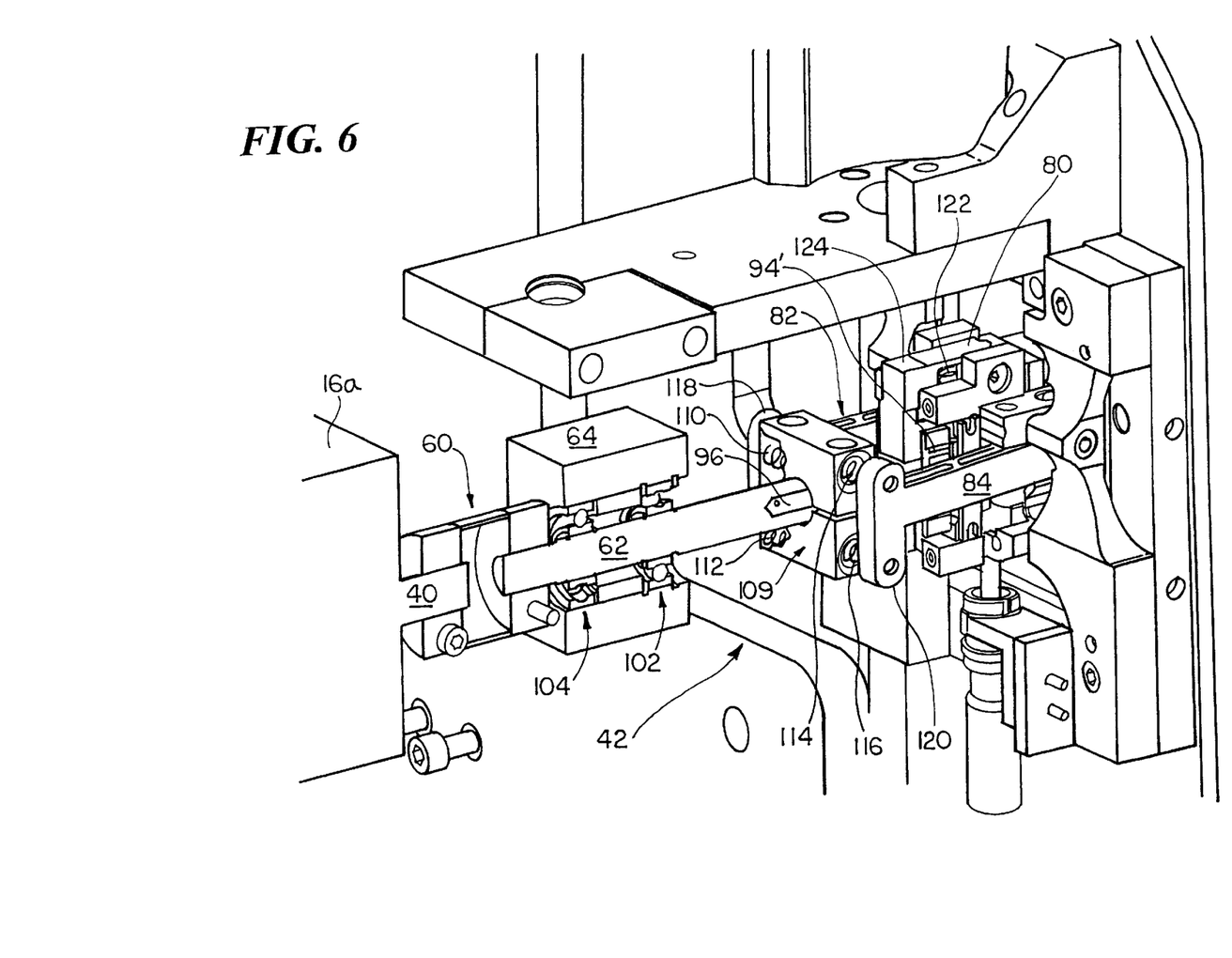
FIG. 6 is an enlarged more detailed view from the right rear of the test fixture of FIGS. 3, 4, and 5.

Levers 82 and 84 are spring biased so that normally their forward ends keep their respective contacts 86 and 88 urged inwardly against the terminals of the integrated circuit gyroscope chip 44 in place on mounting section 70. This is done by means of springs 110, 112, 114, and 116, respectively in spring block 109, FIG. 6 which urge the rearward ends 118, 120 of levers 82 and 84, respectively, outwardly. Also shown in FIG. 6 is spring 122 which keeps clamp lever biased up at its rearward end 124 so that its forward end is normally urged downward to grip an integrated circuit gyroscope chip 44 in place against seat 76. Also shown in FIG. 6 is a portion of the ends 94' of terminals 88 which engage with interface board 90.

Figure 7:
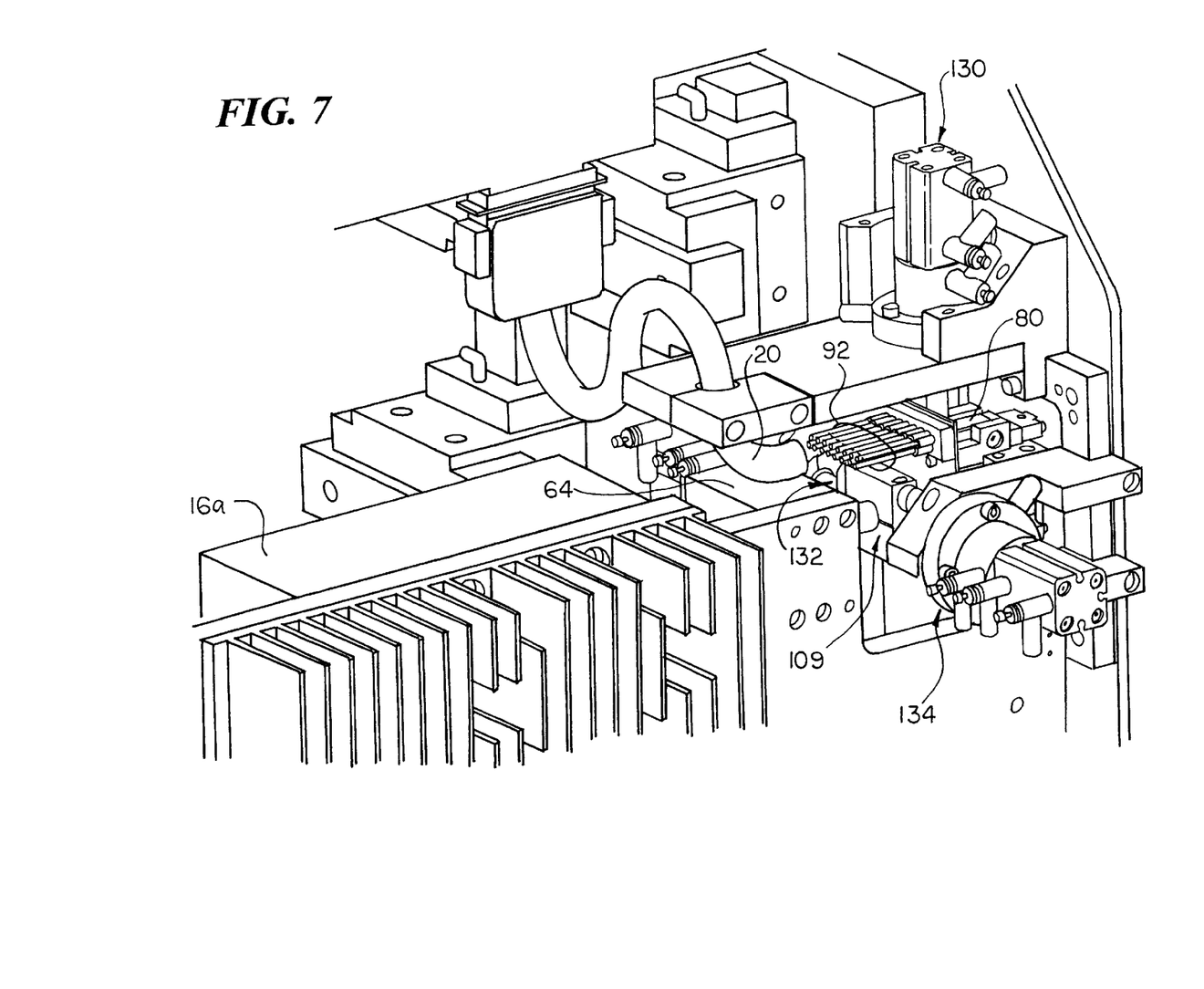
FIG. 7 is a view similar to FIG. 6 showing the actuator components.

The springs are opposed to, and the various levers 80, 82, 84 are actuated by, pneumatic actuators, such as pneumatic actuator 130, FIG. 7, which moves clamp lever 80 against the force of spring 122 to open clamp 78 and allow the integrated circuit gyroscope chip to be mounted. Likewise, pneumatic actuators 132 and 134 operate to urge side levers 82 and 84, respectively, against the force of their springs 110, 112, 114 and 116, respectively, to open and spread their contacts 86 and 88 to allow the integrated circuit gyroscope chip 44 to be positioned at mounting section 70. The juxtaposition of wires 92 and cable 20 which is formed from wires 92 is also shown in FIG. 7.

Figure 8:
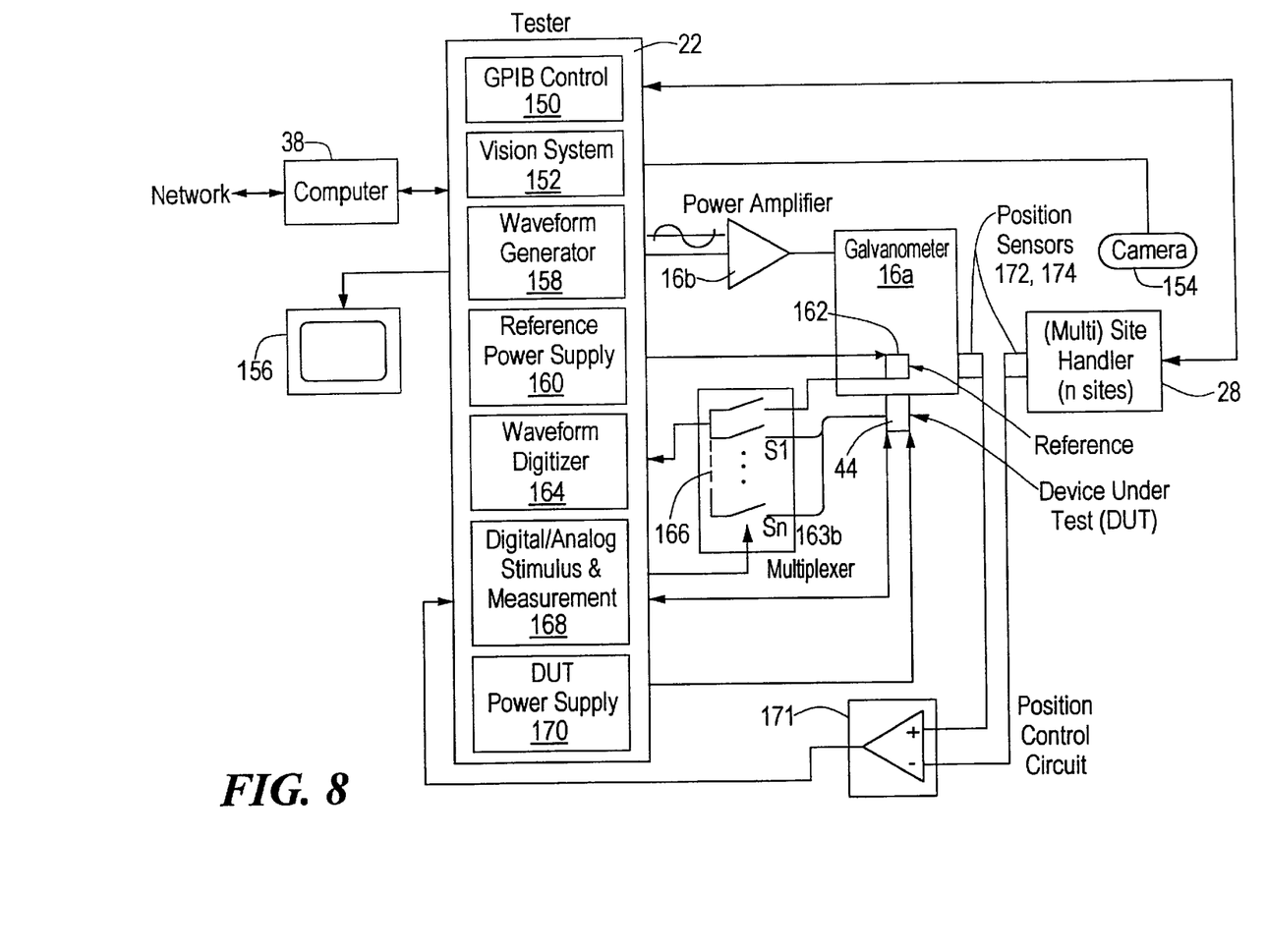
FIG. 8 is a functional block diagram of the system according to this invention.

Tester 22, FIG. 8, may include a general purpose interface bus (GPIP), control block 150, and a vision system 152. The vision system may include a TV camera 154 inside of the handler 28 or close to it so that it can see and identify each integrated circuit gyroscope chip as it is being tested and the test result can be coordinated with the specific device for binning. Vision system 152 may also include a monitor 156 so that an operator can see exactly what is occurring and what piece is under test. A waveform generator 158 generates a sine wave which is used by the galvanometer control power amplifier 16b to drive galvanometer motor 16a with a smooth sinusoidal motion. A reference power supply 160 powers reference sensor 162 and a waveform digitizer 164 receives the signal from the device under test 44 through switching circuit 166 which may be a simple switching circuit if a single handler 28 is used or maybe a multiplex switching system if a multisite handler having n sites is used. A digital/analog stimulus and measurement circuit 168 is used to provide the test signals to the device under test, the integrated circuit gyroscope chip 44, and to receive the outputs from that system as it is rotated smoothly, sinusoidally by galvanometer motor 16a. Tester 22 also includes a device under test (DUT) power supply 170 for powering integrated circuit gyroscope chip 44 and a position control circuit 171 which receives the output from position sensor 172 and 174 and delivers it to the digital/analog stimulus and measurement circuit 168 so that the electrical test signals can be coordinated with the rotary position of the device under test at any moment.

Figure 9:
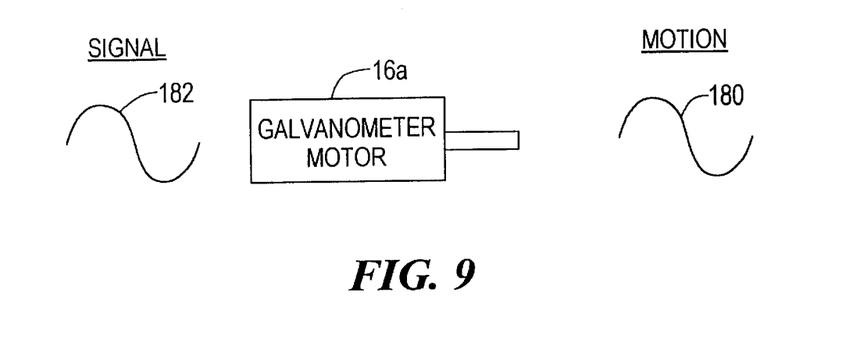
FIGS. 9, 10, and 11 illustrate the galvanometer, stepper motor and torsional vibrator and their wave forms, respectively.
Figure 10:
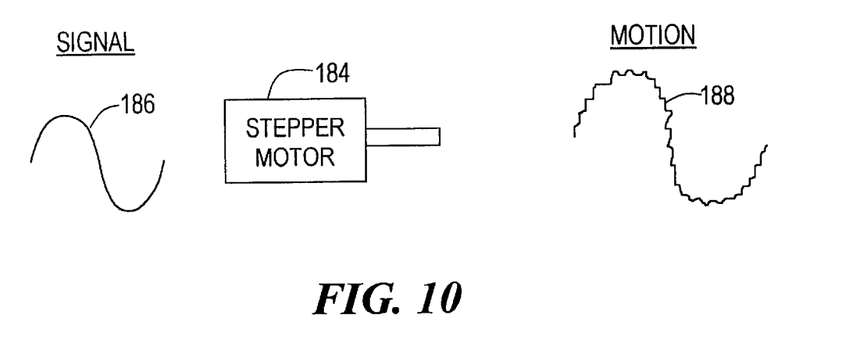
Figure 11:
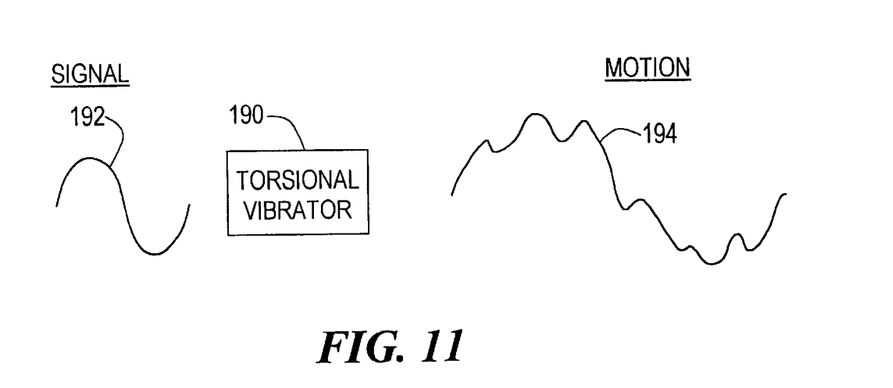

The galvanometer motor 16a of this invention provides a smooth sinusoidal motion 180, FIG. 9, in response to a sinusoidal input signal 182. This is not the case for other devices, for example, stepper motor 184, FIG. 10, when provided with a sinusoidal input signal 186 provides a stepped output motion 188 in which the steep slopes of the vertical sides of the steps can overload the amplifier and introduce errors into the signal. The situation is equally undesirable if conventional torsional vibrators 190, FIG. 11, are used. There, a sinusoidal input 192 results in a motion 194 that has significant harmonic distortion that will introduce significant errors into the test.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An automatic, integrated mechanical and electrical angular motion detector test system comprising:

a test fixture for holding an angular motion detector to be mechanically and electrically tested;

a handler subsystem for feeding an angular motion detector to said test fixture;

a motor having a rotatable shaft attached to said test fixture for rotating it and the angular motion detector it holds; and an electrical tester for testing said angular motion detector while it is rotating.

2. The test system of claim 1 in which said test fixture includes a seat for supporting said angular motion detector in said test fixture.

3. The test system of claim 2 in which said text fixture includes a clamp for urging said angular motion detector against said seat.

4. The test system of claim 1 in which said test fixture includes a vacuum chuck for sensing the presence of an angular motion detector to be tested.

5. The test system of claim 1 in which said test fixture includes a contactor having at least one set of gripping contacts for engaging an angular motion detector to be tested.

6. The test system of claim 3 in which said clamp includes a lever and an actuator for driving said lever to operate said clamp.

7. The test system of claim 5 in which said contactor includes a lever and an actuator for driving said lever to operate said gripping contacts.

8. The test system of claim 1 in which said motor includes an oscillator motor.

9. The test system of claim 8 in which said motor produces a sinusoidal output motion to said test fixture.

10. The test system of claim 1 in which said motor includes a stepper motor.

11. The test system of claim 1 in which said motor includes a galvanometer.

12. The test system of claim 1 in which said angular motion detector is a gyroscope.

13. The test system of claim 12 in which said gyroscope is an integrated circuit chip gyroscope.

14. The test system of claim 12 in which said gyroscope is a micromachined integrated circuit chip gyroscope.

15. The test system of claim 1 in which said angular motion detector is an angular accelerometer.

* * * * *